(12) United States Patent
Martinez

(10) Patent No.: US 6,497,386 B2
(45) Date of Patent: Dec. 24, 2002

(54) BREATHING MASK STOWAGE BOX

(75) Inventor: Patrice Martinez, Plaisir Cedex (FR)

(73) Assignee: Intertechnique, Plaisir Cedex (FR)

( * ) Notice: Subject to any disclaimer, the term of this patent is extended or adjusted under 35 U.S.C. 154(b) by 0 days.

(21) Appl. No.: 09/928,658

(22) Filed: Aug. 14, 2001

(65) Prior Publication Data

US 2002/0020652 A1 Feb. 21, 2002

(30) Foreign Application Priority Data

Aug. 17, 2000 (FR) .............................................. 00 10676

(51) Int. Cl.$^7$ ................................................ B64D 13/00
(52) U.S. Cl. ................................ 244/118.5; 128/206.27
(58) Field of Search .......................... 244/118.5, 129.1, 244/129.4; 128/206.27, 205.24, 204.29, 202.13, 205.25; 249/70

(56) References Cited

U.S. PATENT DOCUMENTS 2,931,355 A * 4/1960 Miller et al.
3,073,301 A * 1/1963 Hay et al.
3,503,394 A * 3/1970 Hotz et al.
4,023,874 A * 5/1977 Jong et al. ................ 244/118.5

FOREIGN PATENT DOCUMENTS

FR           1.214.998         10/1958

\* cited by examiner

*Primary Examiner*—Galen L. Barefoot
(74) *Attorney, Agent, or Firm*—Larson & Taylor PLC

(57) ABSTRACT

A box for storage of passenger oxygen masks in an aircraft has a housing which contains a network for distributing oxygen from a general pipe or from a chemical generator and a door arranged to be beneath the box when it is in position in an aircraft. An inside face of the door or of the housing carries cradles defining a retaining position for each of the oxygen masks and latches that are displaceable responsive to closing the door from a position in which they define mask-retaining sockets to a position in which the latches release the masks.

10 Claims, 1 Drawing Sheet

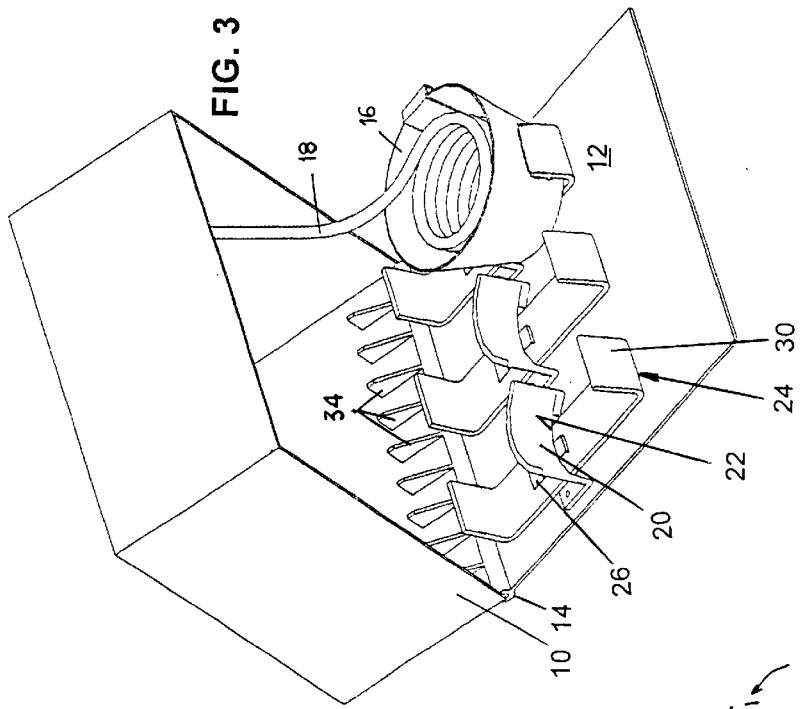
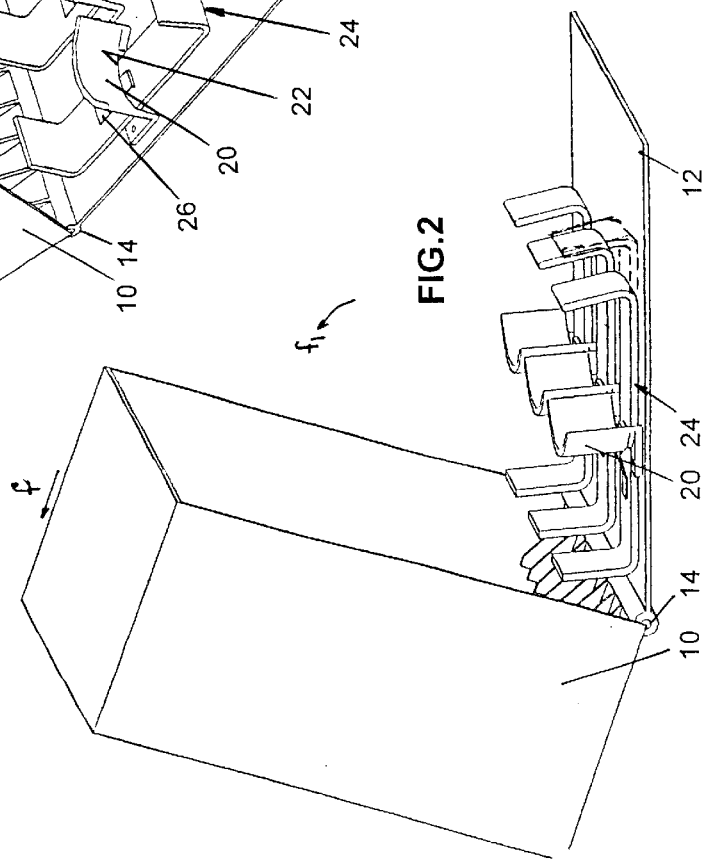
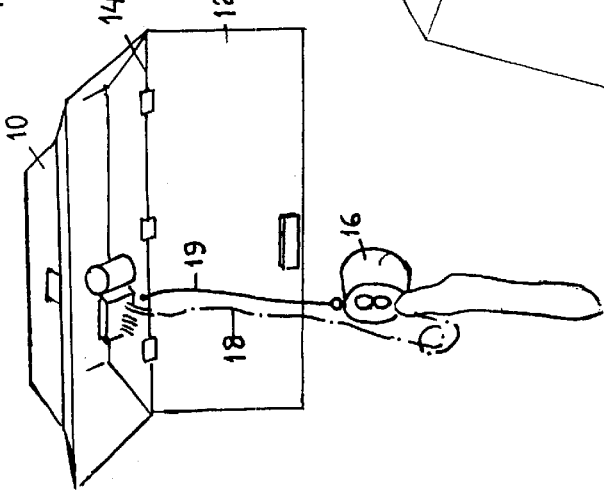

BREATHING MASK STOWAGE BOX

BACKGROUND OF THE INVENTION

The present invention relates to boxes for stowing breathing masks used on board airplanes to receive passenger masks. Such a box generally comprises a housing or frame which contains a network for distributing oxygen from a general pipe or from a chemical generator, a door placed beneath the box when it is in position, and door locking means which are releasable, e.g. by feeding the network at a pressure greater than a determined threshold, or under electrical control. The feed pressure threshold is selected in such a manner that the rate at which oxygen is supplied to passengers ensures they can survive during the time required to reach a safe altitude from the maximum cruising altitude of the airplane. This pressure threshold generally lies in the range 3 bars to 4 bars.

The masks are typically placed on the inside side of the door in such a manner as to drop out when the door is opened, leaving the masks connected to the box solely via their respective feed hoses and pull cords for opening individual cocks for feeding the masks with oxygen.

Proper stowage of a plurality of masks in a single box is difficult and takes a long time. It must be certain that when the door of a box is opened the masks will drop out without tangling their feed hoses. It is not appropriate to lock the masks into individual retaining sockets since they would then run the risk of not dropping out when the box opens.

SUMMARY OF THE INVENTION

It is an object of the invention to provide a box facilitating stowage of masks without impeding their release.

To this end, there is provided a box whose inside face of the door or whose housing is provided with cradle means defining a retaining position for each mask and with latches that are displaceable responsive to closing the door from a position in which they define mask-retaining sockets to a position in which the latches release the masks.

The latches can be independent, thus making it possible to connect and position all of the masks in succession without those that have already been installed impeding placement of others or running the risk of dropping out. Nevertheless, the latches can be all interconnected, in which case the masks are forced so as to wedge them in their sockets. In either case, a convenient way of moving the latches during closure consists in providing them with resilient means for holding them in the position where they define the sockets and in providing means on the box or the box housing that act as a cam while the door is being closed and push back the latches, overcoming the retaining force of the resilient means.

The above features, and others, will appear more clearly on reading the following description of a particular embodiment given by way of non-limiting example and from the comparison which is made with a conventional mask box. The description refers to the accompanying drawings.

BRIEF DESCRIPTION OF THE DRAWINGS

FIG. 1 is a diagrammatic perspective view showing the main elements off mask box in common use; and FIGS. 2 and 3 are highly simplified perspective views showing the elements to which the invention relates, the latches being placed in the position in which they define mask-retaining sockets.

DETAILED DESCRIPTION

The box shown in FIG. 1 is for feeding via a feed pipe of an onboard oxygen network. It comprises a box or housing 10 which, when the box is mounted in an airplane, is placed so that the direction marked by arrow f is substantially vertical. The box also has a door 12 hinged to the housing about an axis 14. The housing and the door are provided with door-retaining means which can be of conventional design. These retaining means are caused to open under pneumatic control when the pressure in the feed pipe reaches a determined value, or else they are opened electrically. The box also carries an oxygen feed network supplied with oxygen from a general feed pipe (not shown). This network is separated from the feed pipe by a check valve which opens when the pressure in the general feed pipe rises above a determined relative pressure, generally lying in the range 3 bars to 4 bars.

Each mask, such as the single mask 16 shown in FIG. 2, is connected to an endpiece forming part of the network by a flexible hose 18 and a cock which opens when traction is applied to a cord 19 connected to the mask. For this purpose, the cord is attached to a pin for holding the mask feed cock in its closed position. When the box is fed by means of a chemical generator, traction on the cord actuates a triggering striker.

The box shown in FIG. 1 is for receiving three masks, only one of which is shown, but this number is not limiting. In general, each box contains as many masks as there are seats in the row served, plus one.

A location is provided to receive each of the masks and to hold it temporarily until the box is closed.

The box of the invention as shown in FIGS. 2 and 3 is generally similar in design to the box described above. However, the retaining means can be of the kind described in French patent application No. 00 10 677 Each location is defined by cradle means 20 formed, in the embodiment shown, by a circularly arcuate rest or abutting member fixed to the door by any suitable means such as rivets. A bottom notch 22 in the rest allows a latch 24 to pass through for the purpose of holding a mask 16 by clamping it. Each of the latches shown in the figure is U-shaped. The web of the U-shape is flat and slides against the door. It carries a spring blade 26 for retaining the latch in the position illustrated in FIGS. 2 and 3 where the front branch 30 of the latch clamps a respective mask against the cradle rest 20. The rear branch 32 of the latch is placed facing projections 34 carried by the housing and constituting cams which, during the final stage of moving the door in the closing direction f1, push against the latches and release the masks.

The stowing sequence of the masks is as follows. The operator moves the latches forwardly to the position shown in dashed lines in FIG. 2. Each mask is put into place in turn and immediately locked in place by pushing the latch back into the position shown in FIGS. 2 and 3.

It is also possible for the operator to place all the latches initially in the position shown in FIG. 2 and then to force the masks into their sockets. This technique must be used if all of the latches form portions of a single piece.

Once all of the masks are in place, the operator closes the door, thereby unlocking the masks.

The disposition described above can be inverted, with the mask receptacles being in the housing while the cams are placed on the door.

The box can also include a "first aid" takeoff enabling an individual mask to be fed for delivering oxygen to a passenger suffering from a malaise. Under such circumstances, when the box is fed from an onboard network, oxygen supply to this takeoff can take place by the means described in the above-mentioned French patent application and in the corresponding U.S. patent application No. 09/929 058 (Martinez).

What is claimed is:

1. A box for storage of passenger oxygen masks in an aircraft, having:
    a housing which contains a network for distributing oxygen from a general pipe or from a chemical generator, and
    a door placed beneath the box when said door is in a position where it closes the box,
    wherein an inside face of the door or of the housing carries:
        cradle means defining a retaining position for each of said oxygen masks and
        latches that are displaceable responsive to closing the door from a position in which they define mask-retaining sockets to a position in which the latches release the masks.

2. A box according to claim 1, wherein each of said sockets is defined by rest means and by one of said latches which is slidable and apt to retain one mask by clamping said mask against the rest means.

3. A box according to claim 2, wherein each of said rest means comprises a circularly arcuate member fixed to the door.

4. A box according to claim 2, wherein said arcuate member is formed with a bottom notch allowing the latch to pass through.

5. A box according to claim 1, wherein each of the latches is U-shaped with a flat web slidable against and along the door.

6. A box according to claim 2, wherein each of the latches is U-shaped with a flat web slidable against and along the door and wherein the web carries a spring blade for retaining the latch in a position where a front branch of the latch clamps one mask against the rest means.

7. A box according to claim 1, wherein all said latches constitute a single piece.

8. A box for storage of passenger oxygen masks in an aircraft, having:
    a housing which contains a network for distributing oxygen from a general pipe or from a chemical generator, and
    a door placed beneath the box when it is in position,
    wherein an inside face of the door or of the housing carries:
        cradle means defining a retaining position for each of said oxygen masks and
        latches that are displaceable responsive to closing the door from a position in which they define mask-retaining sockets to a position in which the latches release the masks
    wherein the housing has projections constituting cams arranged for disabling the latches and freeing the masks upon closure of the door.

9. A box for storage of a plurality of passenger breathing masks in an aircraft, having:
    a housing having means for distributing oxygen to said breathing masks,
    a door arranged to be retained by releasable door retaining means in a first position where it is placed beneath the box and closes said housing and to move to a second position where it opens said housing upon release of said door retaining means, and
    latch means carried by an inside face of the door or of the housing, movable between a first position where said latch means define retaining sockets for said breathing masks and a second, position where said latch means release said breathing masks,
    said latch means being arranged to be forcibly displaced from said first position of said latch means to said second position responsive to closing displacement of the door from said second position of the door to said first position.

10. A box according to claim 9, further having resilient means for locking said latch means in said first position of said latch means and arranged to be disabled upon said closing displacement of said door.

* * * * *